United States Patent [19]

Sugitani et al.

[11] Patent Number: 4,816,641

[45] Date of Patent: Mar. 28, 1989

[54] AUTOMATIC ARC-WELDING METHOD

[75] Inventors: Yuji Sugitani; Yasuhiko Nishi, both of Tokyo, Japan

[73] Assignee: NKK Corporation, Tokyo, Japan

[21] Appl. No.: 219,351

[22] Filed: Jul. 14, 1988

[30] Foreign Application Priority Data

Jul. 20, 1987 [JP] Japan .................................. 62-180358

[51] Int. Cl.[4] ................................................ B23K 9/12
[52] U.S. Cl. .......................... 219/137 PS; 219/124.22; 219/130.21; 219/137.71
[58] Field of Search ...................... 219/137 PS, 130.21, 219/137.71, 124.34, 124.22

[56] References Cited

U.S. PATENT DOCUMENTS

| | | | |
|---|---|---|---|
| 4,532,404 | 7/1985 | Biollot et al. | 219/124.34 |
| 4,591,689 | 5/1986 | Brown et al. | 219/124.34 |
| 4,733,051 | 3/1988 | Nadeau et al. | 219/124.34 |

Primary Examiner—Clifford C. Shaw
Attorney, Agent, or Firm—Frishauf, Holtz, Goodman & Woodward

[57] ABSTRACT

An automatic arc-welding method, which comprises, when welding two objects to be welded together by means of a welding wire along a groove formed between the objects to be welded, continuously determining by calculation a target welding current, with which a depth of penetration agrees with a target value thereof, on the basis of the root gap, the material of the welding wire and the like; continuously determining by calculation a target feeding rate of the welding wire, at which an extension length of the welding wire agrees with a target value thereof, on the basis of the welding current, the material of the welding wire and the like; and continuously determining by calculation a target welding speed, at which a height of the weld bead agrees with a target value thereof, on the basis of the feeding rate of the welding wire, the material of the welding wire, the root gap and the like; thereby automatically controlling the welding current, the feeding rate of the welding wire and the welding speed on the basis of the respective target values thus determined.

1 Claim, 4 Drawing Sheets

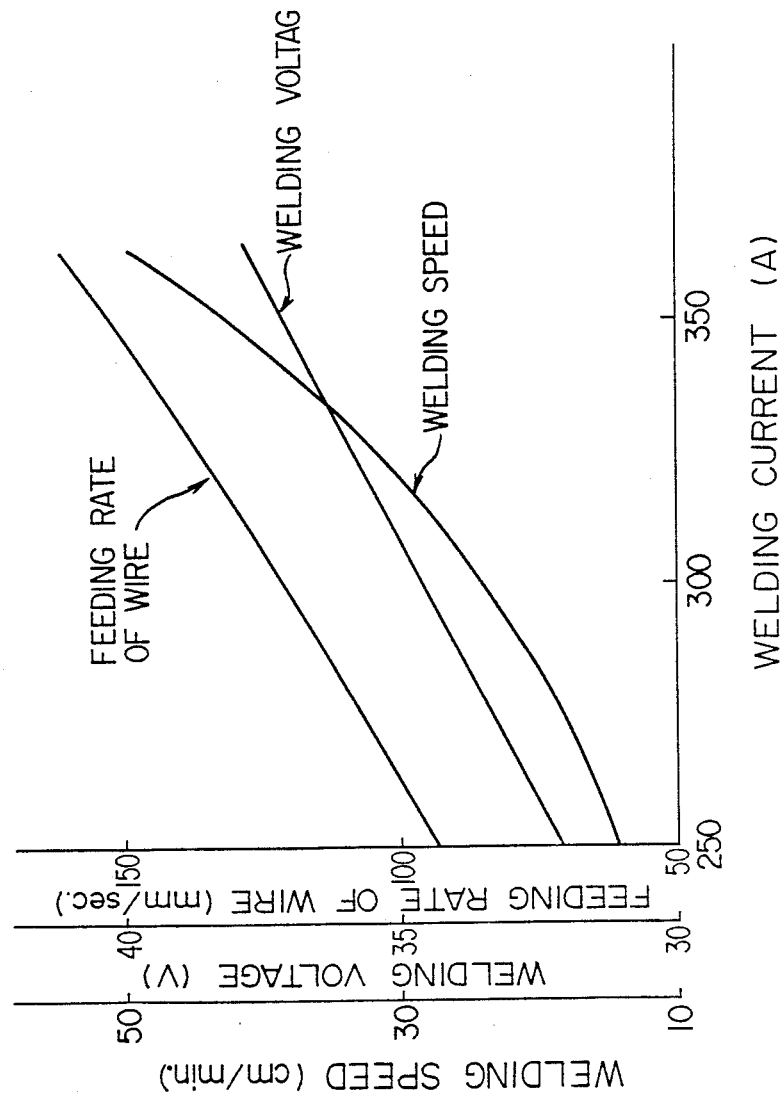

AUTOMATIC ARC-WELDING METHOD

FIELD OF THE INVENTION

The present invention relates to an automatic arc-welding method using a welding wire as a consumable welding electrode and more particularly an automatic arc-welding method which permits, when welding two objects to be welded together along the longitudinal direction of a groove formed in between, prevention of a burn-through even upon change in the distance of a root gap, maintenance of a constant height of a weld bead, and stabilization of an arc.

BACKGROUND OF THE INVENTION

When arc-welding two objects to be welded together along the longitudinal direction of a groove formed therebetween by means of a welding wire such as a consumable welding electrode, welding is usually carried out with a distance of a root gap of the groove of zero, i.e., with the root faces kept in contact with each other. Particularly when conducting automatic arc-welding, it is the usual practice to strictly control the distance of the root gap so that the maximum distance of the root gap is kept at 1 mm. A large distance of the root gap leads to an incomplete penetration and a burn-through. Actually, however, variations in the distance of the root gap in the longitudinal direction of the groove are inevitable because of the limit in accuracy of machining.

It is thus the conventional practice, before welding objects to be welded together along a groove, to modify the distance of the root gap in advance within allowable limits over the entire length of the groove by filling up portions with a large distance of the root gap by a manual welding, for example. In addition, it is necessary to increase a height of the root face so as not to cause a burn-through.

However, such a manual operation to fill up the root gap carried out before the full-scale welding leads to a decreased efficiency of welding operations as a whole. Furthermore, as described above, it is necessary to increase the height of the root face of the groove. As a result, when double-welding the objects to be welded from both the first and second sides thereof, after welding of a first groove formed on the first side and before welding of a second groove formed on the second side, it is necessary to chip the second groove by gouging for example, until the bottom surface of the second groove reaches the weld bead formed in the first groove, in order to ensure a satisfactory penetration.

Under such circumstances, there is a demand for development of an automatic arc-welding method, which ensures a constant depth of penetration, even upon change in the distance of a root, gap in the longitudinal direction of the groove. This prevention of a burn-through without increasing a height of the root face, and insures maintenance of a constant height of the weld bead and stabilization of an arc, but such an automatic arc-welding method has not as yet been proposed.

SUMMARY OF THE INVENTION

An object of the present invention is therefore to provide an automatic arc-welding method, which ensures a constant depth of penetration, even upon change in the distance of a root gap in the longitudinal direction of the groove, permits prevention of a burn through without increasing a height of the root face, and insures maintenance of a constant height of the weld bead and stabilization of an arc.

In accordance with one of the features of the present invention, there is provided an automatic arc-welding method which comprises:

continuously supplying a welding wire as a consumable welding electrode at a prescribed feeding rate substantially vertically through a nozzle toward a groove formed between two objects to be welded, continuously moving said nozzle together with said welding wire along the longitudinal direction of said groove; and supplying a prescribed welding current to said welding wire to produce an arc between the tip of said welding wire and said groove, thereby welding said objects to be welded together at a prescribed welding speed along said groove by means of the arc heat.

The improvement of the present invention comprises, when welding said objects to be welded together along said groove, the steps of:

(a) continuously measuring a distance of a root gap of said groove in the downstream of said nozzle in the travelling direction thereof;

(b) calculating a target welding current (I), with which a depth of penetration agrees with a target value thereof, in accordance with the following formula (1):

$$I = I_o - KG \tag{1}$$

where,
I: target welding current,
Io: welding current when the distance of root gap is zero,
K: constant dependent on the depth of penetration, the kind of shielding gas, the material of the welding wire and the like, and
G: distance of root gap,
and controlling said welding current so as to agree with the thus calculated target welding current;

(c) calculating a target feeding rate ($V_f$) of said welding wire, at which an extension length of said welding wire from the tip of said nozzle agrees with a target value thereof, in accordance with the following formula (2):

$$V_f = A \cdot I + B \cdot l \cdot I^2 \tag{2}$$

where,
$V_f$: target feeding rate of welding wire,
I: welding current,
l: extension length of welding wire, and
A, B: constants dependent on the kind of shielding gas, the material of the welding wire and the like,
and controlling said feeding rate of said welding wire so as to agree with the thus calculated target feeding rate of said welding wire;

(d) calculating a target welding speed (V), at which a height of the weld bead agrees with a target value thereof, in accordance with the following formula (3):

$$V = V_f (V_{fo}/V_o + (d/k) \cdot G) \tag{3}$$

where,
V: target welding speed,
$V_f$: feeding rate of welding wire, $V_{fo}$: feeding rate of welding wire when the distance of root gap is zero, $V_o$: welding speed when the distance of root gap is zero, d: distance between the lowermost point of penetration and the uppermost point of weld bead, k: product of multiplication of the cross-sectional area of the welding wire and the deposition efficiency, and G: distance of root gap, and controlling said welding speed so as to agree with the thus calculated target welding speed.

BRIEF DESCRIPTION OF THE DRAWINGS

FIG. 4 is a graph illustrating the relationship between a welding current, a feeding rate of the welding wire, a welding voltage and a welding speed.

DETAILED DESCRIPTION OF PREFERRED EMBODIMENTS

From the above-mentioned point of view, extensive studies were carried out for the purpose of developing an automatic arc-welding method, which ensures a constant depth of penetration, even upon change in the distance of a root gap in the longitudinal direction of the groove, permits prevention of a burn-through without increasing a height of the root face, and insures maintenance of a constant height of the weld bead and stabilization of an arc. As a result, the following finding was obtained:

(1) It is possible to determine by calculation a target welding current, with which a depth of penetration agrees with a target value thereof, by measuring a distance of a root gap of the groove, if there is found a certain relationship between the welding current and the distance of the root gap, in respect of the depth of penetration.

(2) It is possible to determine by calculation a target welding speed under the above-mentioned target welding current, at which a height of the weld bead agrees with a target value thereof, if there is found a certain relationship between the welding current, the welding speed, the feeding rate of the welding wire and the distance of the root gap, in respect of the height of the weld bead.

(3) It is possible to determine by calculation a target feeding rate of the welding wire under the above-mentioned target welding current, at which an extension length of the welding wire from the tip of the nozzle agrees with a target value thereof, if there is found a certain relationship between the welding current and the feeding rate of the welding wire, in respect of the extension length of the welding wire.

The present invention was made on the basis of the above-mentioned findings. Now, the automatic arc-welding method of the present invention is described in detail with reference to drawings.

Figure 1:
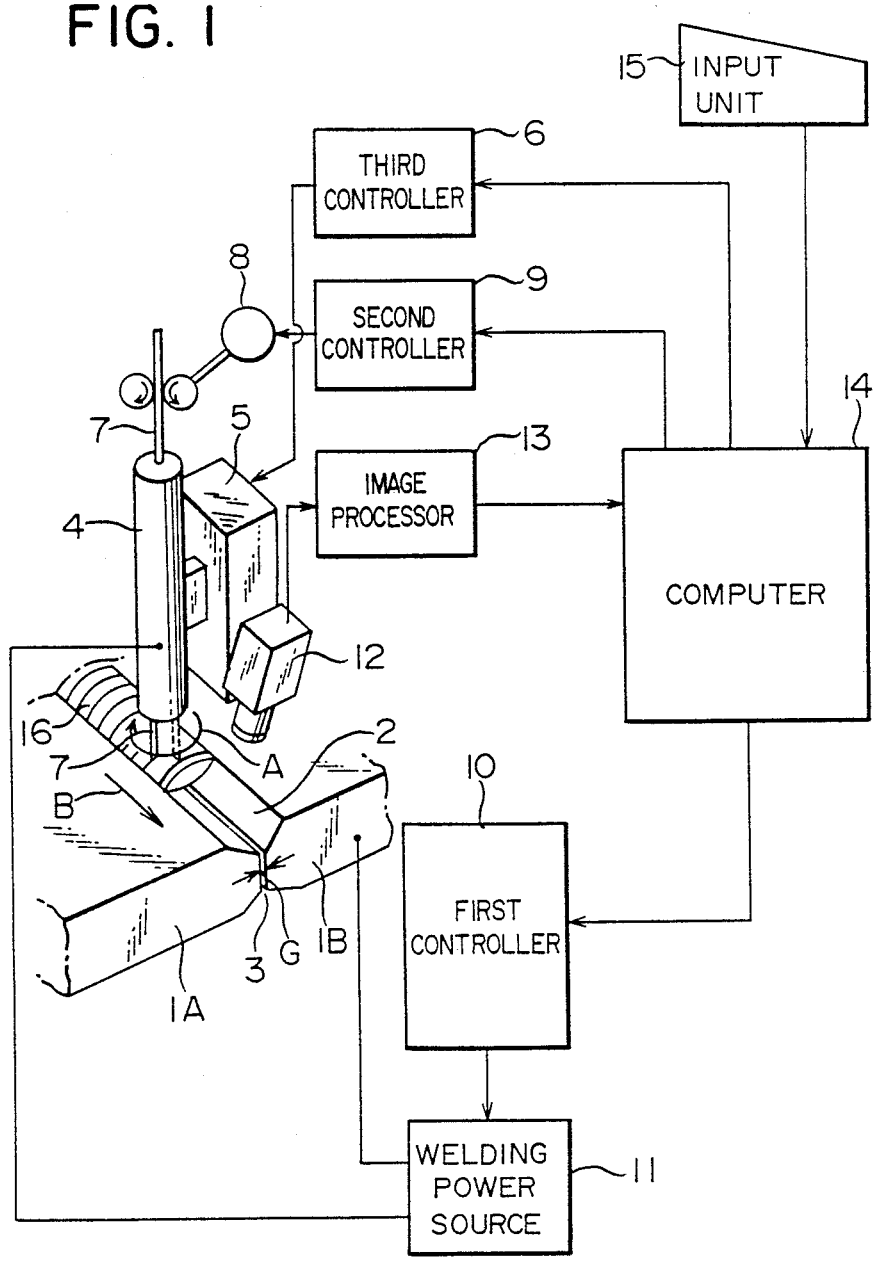
FIG. 1 is a block diagram illustrating an embodiment of the automatic arc-welding method of the present invention.

FIG. 1 is a block diagram illustrating an embodiment of the automatic arc-welding method of the present invention.

As shown in FIG. 1, two objects to be welded 1A and 1B are welded together along a groove 2 formed in between.

A nozzle 3 continuously travels along the groove by the action of a transfer unit 4. A travelling speed of the transfer unit 4, i.e., a welding speed, is controlled by a third controller 5 so that a height of the weld bead agrees with a target value thereof as described later. The nozzle 3 is rotatable at a high speed around the center axis thereof in the direction indicated by A in FIG. 1.

A welding wire 6 as a consumable welding electrode is inserted into the nozzle 3 eccentrically from the center axis thereof. The welding wire 6 is continuously supplied by a welding wire feeder 7 toward the groove 2 substantially vertically through the nozzle 3. The feeding rate of the welding wire 6 by the welding wire feeder 7 is controlled by a second controller 8 so that an extension length of the welding wire 6 from the tip of the nozzle 3 agrees with a target value thereof.

A welding current, with which a depth of penetration agrees with a target value thereof, as described later, is supplied between the objects to be welded 1A and 1B, and the welding wire 6 from a welding power source 10 which is controlled by a first controller 9, whereby an arc is produced between the tip of the welding wire 6 and the groove 2, and the objects to be welded 1A and 1B are welded together along the groove 2 by the arc heat. The groove 2 is shielded from the open air by a shielding gas ejected from a nozzle (not shown) provided in the vicinity of the tip of the nozzle 3. It is needless to mention that application of the present invention is not limited to the above-mentioned method known as the rotating arc-welding method.

A television camera 11 continuously shoots the groove 2 in the downstream in the travelling direction of the nozzle 3 (the direction indicated by B in FIG. 1). The television camera 11 is secured to the transfer unit 4.

An image processor 12 continuously measures a distance of a root gap of the groove 2 in response to a shooting signal from the television camera 11. The data on the distance of the root gap measured by the image processor 12 are entered into a computer described later.

A computer 13 provides the first controller 9, the second controller 8 and the third controller 5 with respective results of calculation as described later. The following formulae (1) to (3) for use when welding the objects to be welded 1A and 1B together along the groove 2 are previously entered into the computer 13:

$$I = I_o - KG \tag{1}$$

Formula (1) above is for the calculation of a target welding current (I), with which a depth of penetration agrees with a target value thereof. In formula (1), I: target welding current, $I_o$: welding current when the distance of root gap is zero, K: constant dependent on the depth of penetration, the kind of shielding gas, the material of welding wire and the like, and G: distance of root gap.

The computer 13 provides the first controller 9 with the result of calculation of the target welding current. The above-mentioned $I_o$ and K are previously entered into the computer 13 from an input unit 14.

Figure 2:
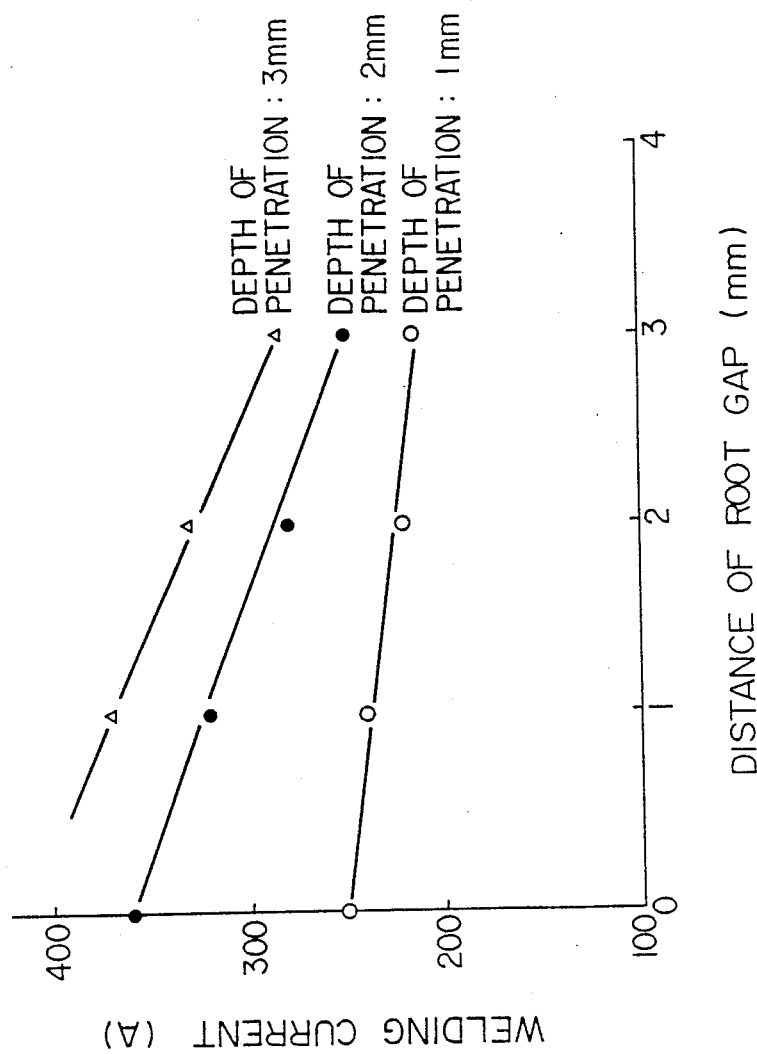
FIG. 2 is a graph illustrating the relationship between a distance of the root gap of the groove and a welding current, with a depth of penetration as the parameter.

FIG. 2 is a graph illustrating the relationship between a distance of the root gap of the groove and a welding current, with a depth of penetration as the parameter. More specifically, the graph of FIG. 2 clearly shows that there exists a certain relationship between the actual distance as measured of the root gap and the actual welding current as applied when accomplishing the respective depth of penetration of 1 mm, 2 mm and 3 mm, and therefore demonstrates that Formula (1) above is valid.

$$V_f = A \cdot I + B \cdot l \cdot I^2 \qquad (2)$$

Formula (2) above is for the calculation of a target feeding rate $V_f$ of the welding wire, at which an extension length of the welding wire from the tip of the nozzle 4 agrees with a target value thereof. In Formula (2), $V_f$: target feeding rate of welding wire,
I: welding current,
l: extension length of welding wire, and
A, B: constants dependent on the kind of shielding gas, the material of the welding wire and the like.

The computer 13 provides the second controller 8 with the result of calculation of the target feeding rate of the welding wire. The feeding rate of the welding wire is controlled so that the extension length of welding wire agrees with the target value thereof to ensure stabilization of the arc.

FIG. 4 is a graph illustrating the relationship between a welding current, a feeding rate of the welding wire, a welding voltage and a welding speed. In FIG. 4, the line representing the feeding rate of the welding wire clearly shows that there exists a certain relationship between the actual welding current as applied and the actual feeding rate of the welding wire, and therefore demonstrates that Formula (2) is valid.

$$V = V_f (V_{fo}/V_o + (d/k) \cdot G) \qquad (3)$$

Formula (3) above is for the calculation of a target welding speed (V), at which a height of the weld bead agrees with a target value thereof. In Formula (3), V: target welding speed,
$V_f$: feeding rate of welding wire,
$V_{fo}$: feeding rate of welding wire when the distance of root gap is zero,
$V_o$: welding speed when the distance of root gap is zero,
d: distance between the lowermost point of penetration and the uppermost point of weld bead,
k: product of multiplication of the cross-sectional area of the welding wire and the deposition efficiently, and
G: distance of root gap.

The computer 13 provides the third controller 5 with the result of calculation of the target welding speed. The above-mentioned $V_{fo}$, $V_o$, d and k are previously entered into the computer 13 from the input unit 14. In FIG. 4, the line representing the welding speed clearly shows that there exists a certain relationship between the actual welding current as applied and the actual welding speed as applied, and therefore demonstrates that Formula (3) is valid.

The welding voltage should preferably be controlled so as to further stabilize the arc. For this purpose, the following formula (4) is previously entered into the computer 13:

$$E_t = E_l + E_a + E_r \qquad (4)$$

Formula (4) above is for the calculation of a target welding voltage ($E_t$), with which a length of the rc agrees with a target value thereof. In Formula (4), $E_t$: target welding voltage,
$E_l$: voltage drop caused by the extension length of the welding wire,
$E_a$: arc voltage, and
$E_r$: voltage drop caused by resistance equal to the sum of resistance between an output end of the welding power source and the nozzle and resistance between the other output end of the welding power source and the objects to be welded.

The above-mentioned $E_l$, $E_a$ and $E_r$ are expressed respectively by the following formulae (5) to (7):

$$E_l = a \cdot I - b \cdot V_f / I \qquad (5)$$

$$E_a = E_o(I) + x \cdot l_A \qquad (6)$$

$$E_r = R \cdot I \qquad (7)$$

where,
l: extension length of the welding wire,
I: welding current,
$V_f$: feeding rate of welding wire,
a, b: constants dependent on the kind of shielding gas, the material of the welding wire and the like,
$E_o(I)$: voltage drop equal to the sum of voltage drop of the negative pole and voltage drop of the positive pole,
x: potential gradient of arc column,
$l_a$: arc length, and
R: resistance equal to the sum of resistance between an output end of the welding power source and the nozzle and resistance between the other end of the welding power source and the objects to be welded.

The computer 13 provides the first controller 9 with the result of calculation of the target welding voltage.

In FIG. 4, the line representing the welding voltage clearly shows that there exists a certain relationship between the actual welding current as applied and the actual welding voltage as applied, and therefore demonstrates that Formula (6) is valid.

Now, the case in which the objects to be welded 1A and 1B are welded together along the groove 2 in accordance with the method of the present invention is described.

The nozzle 3 continuously travels along the groove 2 by the action of the transfer unit 4 while rotating at a high speed around the center axis thereof. A welding current is supplied to the welding wire 6 inserted into the nozzle 3 from the welding power source 10 which is controlled by the first controller 9, whereby an arc is produced between the tip of the welding wire 6 and the groove 2, and the objects to be welded 1A and 1B are welded together along the groove 2 by the arc heat.

The groove 2 is shot by the television camera 11 in the downstream in the travelling direction of the nozzle 3. A shooting signal from the television camera 11 is entered into the image processor 12. The image processor 12 continuously measures the distance (G) of the root gap of the groove 2 in response to the shooting signal. The data on the thus measured distance of the root gap is entered into the computer 13. The computer 13 calculates a target welding current (I), with which a depth of penetration agrees with a target value thereof, in accordance with the above-mentioned formula (1) entered previously into the computer 13. The computer 13 provides the first controller 9 with the result of calculation of the target welding current. The first controller 9 controls the welding power source 10 so that a welding current which agrees with the target welding current calculated as described above is supplied to the welding wire 6, whereby the depth of penetration of the groove 2 always agrees with the target value thereof, irrespective of any change in the distance (G) of the root gap.

The computer 13 calculates a target feeding rate ($V_f$) of the welding wire, at which an extension length of the welding wire from the tip of the nozzle 3 agrees with a target value thereof under the target welding current calculated as described above, in accordance with the above-mentioned formula (2) entered previously into the computer 13. The computer 13 provides the second controller 8 with the result of calculation of the target feeding rate of the welding wire. The second controller 8 controls the welding wire feeder 7 so that the welding wire 6 is continuously supplied toward the groove 2 at a feeding rate of the welding wire which agrees with the target feeding rate of the welding wire calculated as described above, whereby the extension length of the welding wire always agrees with the target value thereof, irrespective of any change in the welding current, thus ensuring stabilization of the arc.

The computer 13 calculates a target welding speed (V), at which a height of the weld bead 15 agrees with a target value thereof under the target welding current calculated as described above, in accordance with the above-mentioned formula (3) entered previously into the computer 13. The computer 13 provides the third controller 5 with the result of calculation of the target welding speed. The third controller 5 controls the transfer unit 4 so that the objects to be welded 1A and 1B are welded together along the groove 2 at a welding speed which agrees with the target welding speed calculated as described above, whereby the height of the weld bead 15 always agrees with the target value thereof, irrespective of any change in the distance (G) of the root gap.

Now, an example of the automatic arc welding method of the present invention is described.

EXAMPLE

Figure 3:
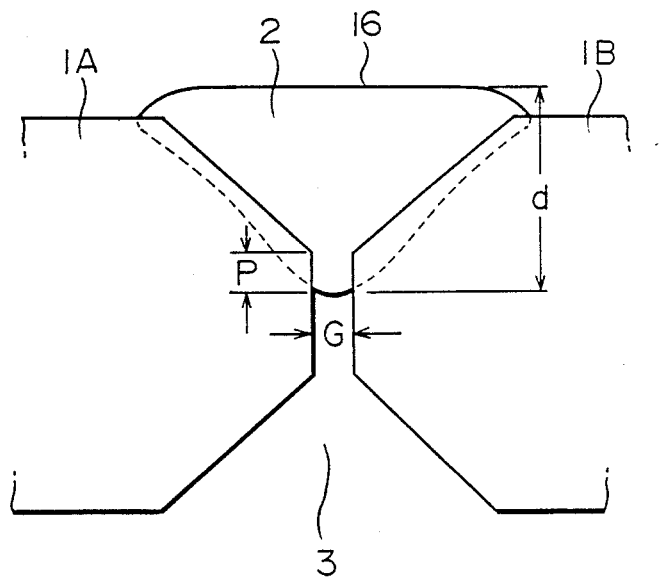
FIG. 3 is a cross-sectional view illustrating a typical example of the groove.

Two stainless steel plates (SUS 304) having a thickness of 10 mm were prepared as the objects to be welded 1A and 1B, and a groove 2 of a shape as shown in FIG. 3 was formed in between. Then, the objects to be welded 1A and 1B were welded together along the groove by means of an automatic arc-welding machine as shown in FIG. 1. A flux-cored wire having a diameter of 1.6 mm was used as the welding wire, and $CO_2$ gas was used as the shielding gas.

First, the following data was previously entered into the computer 13 when welding the objects to be welded 1A and 1B together along the groove 2:
For the calculation of the target welding current (I):
  $P_1$: 2 mm,
  $I_o$: 360A, and
  K: 37,
where, $P_1$: target depth of penetration of the groove,
  $I_o$: welding current when the distance of root gap is zero, and
  K: constant dependent on the depth of penetration, the kind of shielding gas, the material of the welding wire and the like;

For the calculation of the target feeding rate ($V_f$) of welding wire:
  l: 15 mm,
  A: 0.2, and
  B: $4.59 \times 10^{-5}$,
where
  l: extension length of welding wire, and
  A, B: constants dependent on the kind of shielding gas, the material of the welding wire and the like;

For the calculation of the target welding speed (V):
  $V_{fo}$: 161 mm/sec.,
  $V_o$: 8.3 mm/sec.,
  d: 6.5 mm, and
  k: 1 mm$^2$,
where,
  $V_{fo}$: feeding rate of welding wire when the distance of root gap is zero,
  $V_o$: welding speed when the distance of root gap is zero,
  d: distance between the lowermost point of penetration and the uppermost point of weld bead, and
  k: product of multiplication of the cross-sectional area of the welding wire and the deposition efficiency.

The height of the weld bead 15 was investigated on the objects to be welded 1A and 1B thus welded together along the groove 2. The result showed that the height of weld bead 15 was constant is spite of changes in the distance (G) of the root gap. The depth of penetration in the groove 2 agreed with the target value thereof, and thus a satisfactory weld bead free of defects was obtained.

According to the present invention, as described above, a constant depth of penetration is available, irrespective of any change in the distance of the root gap, thereby permitting prevention of a burn-through without increasing the height of the root face, maintenance of a constant height of the weld bead, and stabilization of the arc, thus providing industrially useful effects.

What is claimed is:

1. In an automatic arc-welding method, which comprises:
    continuously supplying a welding wire as a consumable welding electrode at a prescribed feeding rate substantially vertically through a nozzle toward a groove formed between two objects to be welded; continuously moving said nozzle together with said welding wire along the longitudinal direction of said groove; and supplying a prescribed welding current to said welding wire to produce an arc between the tip of said welding wire and said groove, thereby welding said objects to be welded together at a prescribed welding speed along said groove by means of the arc heat;
    the improvement comprising:
    when welding said objects to be welded together along said groove,
    (a) continuously measuring a distance of a root gap of said groove in the downstream of said nozzle in the travelling direction thereof;

(b) calculating a target welding current (I), with which a depth of penetration agrees with a target value thereof, in accordance with the following formula (1):

$$I = I_o - KG \quad (1)$$

where,
- I: target welding current,
- $I_o$: welding current when the distance of root gap is zero,
- K: constant dependent on the depth of penetration, the kind of shielding gas, the material of the welding wire and the like, and
- G: distance of root gap, and controlling said welding current so as to agree with the thus calculated target welding current;

(c) calculating a target feeding rate ($V_f$) of said welding wire, at which an extension length of said welding wire from the tip of said nozzle agrees with a target value thereof, in accordance with the following formula (2):

$$V_f = A \cdot I + B \cdot l \cdot I^2 \quad (2)$$

where,
- $V_f$: target feeding rate of welding wire,
- I: welding current,
- l: extension length of welding wire, and
- A, B: constants dependent on the kind of shielding gas, the material of the welding wire and the like, and controlling said feeding rate of said welding wire so as to agree with the thus calculated target feeding rate of said welding wire;

(d) calculating a target welding speed (V), at which a height of the weld bead agrees with a target value thereof, in accordance with the following formula (3):

$$V = V_f(V_{fo}/V_o + (d/k) \cdot G) \quad (3)$$

where,
- V: target welding speed,
- $V_f$: feeding rate of welding wire,
- $V_{fo}$: feeding rate of welding wire when the distance of root gap is zero,
- $V_o$: welding speed when the distance of root gap is zero,
- d: distance between the lowermost point of penetration and the uppermost point of weld bead,
- k: product of multiplication of the cross-sectional area of the welding wire and the deposition efficiency, and
- G: distance of root gap, and controlling said welding speed so as to agree with the thus calculated target welding speed.

* * * * *